United States Patent
Gulick, Jr. et al.

(10) Patent No.: US 11,684,183 B2
(45) Date of Patent: Jun. 27, 2023

(54) SECURITY DEVICE FOR FUNCTIONAL DISPLAY AND SECURITY OF HANDHELD ELECTRONIC DEVICES

(71) Applicant: Scorpion Security Products, Inc., Binghamton, NY (US)

(72) Inventors: Franklyn W. Gulick, Jr., Binghamton, NY (US); Gary R. Page, Chenango Forks, NY (US)

(73) Assignee: Scorpion Security Products, Inc., Binghamton, NY (US)

( * ) Notice: Subject to any disclaimer, the term of this patent is extended or adjusted under 35 U.S.C. 154(b) by 12 days.

(21) Appl. No.: 17/181,200

(22) Filed: Feb. 22, 2021

(65) Prior Publication Data

US 2021/0169239 A1    Jun. 10, 2021

Related U.S. Application Data

(63) Continuation of application No. 16/233,356, filed on Dec. 27, 2018, now Pat. No. 10,925,414, which is a continuation of application No. 15/238,831, filed on Aug. 17, 2016, now Pat. No. 10,165,873.

(60) Provisional application No. 62/206,007, filed on Aug. 17, 2015.

(51) Int. Cl.
| | |
|---|---|
| *A47F 7/024* | (2006.01) |
| *F16M 13/00* | (2006.01) |
| *G08B 13/14* | (2006.01) |
| *E05B 73/00* | (2006.01) |
| *F16M 11/04* | (2006.01) |
| *F16M 13/02* | (2006.01) |

(52) U.S. Cl.
CPC ............ *A47F 7/0246* (2013.01); *E05B 73/00* (2013.01); *E05B 73/0082* (2013.01); *F16M 11/041* (2013.01); *F16M 13/00* (2013.01); *F16M 13/02* (2013.01); *G08B 13/14* (2013.01)

(58) Field of Classification Search
CPC .... A47F 7/0246; E05B 73/00; E05B 73/0082; F16M 11/041; F16M 13/00; F16M 13/02; G08B 13/14
See application file for complete search history.

(56) References Cited

U.S. PATENT DOCUMENTS

| | | |
|---|---|---|
| 19,622 A | 3/1858 | Clark |
| 242,959 A | 6/1881 | Naglee |
| 297,981 A | 5/1884 | Francis |
| 339,072 A | 3/1886 | Nies |
| 351,550 A | 10/1886 | Weller |
| 528,557 A | 11/1894 | Peabody |
| 685,078 A | 10/1901 | Willringhaus |
| 762,070 A | 6/1904 | Longard |
| 774,810 A | 11/1904 | Willis |
| 887,103 A | 5/1908 | Lane |

(Continued)

FOREIGN PATENT DOCUMENTS

| | | |
|---|---|---|
| EP | 0944148 A2 | 9/1999 |
| JP | 08-156945 | 6/1996 |

(Continued)

*Primary Examiner* — Anita M King
(74) *Attorney, Agent, or Firm* — Barclay Damon LLP

(57) ABSTRACT

A security device and base for a mobile device. The security device includes a body, at least two sliding arms coupled to the body, and a leveling plate coupled to the body and configured to receive the mobile device.

15 Claims, 24 Drawing Sheets

(56) References Cited

U.S. PATENT DOCUMENTS

| | | | |
|---|---|---|---|
| 1,075,384 A | 10/1913 | Seidel | |
| 1,402,621 A | 1/1922 | Knittel et al. | |
| 1,586,314 A | 5/1926 | Kiefer | |
| 1,709,385 A | 4/1929 | Young | |
| 2,094,225 A | 9/1937 | Tuttle | |
| 2,114,227 A | 4/1938 | Kriss | |
| 2,225,273 A | 12/1940 | Jacobs | |
| 2,424,871 A | 7/1947 | Wenk et al. | |
| 2,552,094 A | 5/1951 | Hamon et al. | |
| 2,610,661 A | 9/1952 | Romine | |
| 2,716,362 A | 8/1955 | Novak | |
| 3,741,517 A | 6/1973 | Pogonowski | |
| 3,855,825 A | 12/1974 | Pickard | |
| 4,083,547 A | 4/1978 | Gurley | |
| 4,234,176 A | 11/1980 | Goff et al. | |
| 5,052,199 A | 10/1991 | Derman | |
| 5,246,183 A | 9/1993 | Leyden | |
| 5,457,745 A | 10/1995 | Wang | |
| 5,463,688 A | 10/1995 | Wijas | |
| 5,555,302 A | 9/1996 | Wang | |
| 5,680,782 A | 10/1997 | Komatsu et al. | |
| RE35,677 E | 12/1997 | O'Neill | |
| 5,697,601 A | 12/1997 | Gurule | |
| 5,825,874 A | 10/1998 | Humphreys et al. | |
| 5,848,562 A | 12/1998 | Somma | |
| 5,863,033 A | 1/1999 | Bradford | |
| 5,893,553 A | 4/1999 | Pinkous | |
| 5,903,645 A | 5/1999 | Tsay | |
| 6,000,686 A | 12/1999 | Yates | |
| 6,002,921 A | 12/1999 | Pfahlert et al. | |
| 6,161,823 A | 12/2000 | Bradford | |
| 6,176,479 B1 | 1/2001 | Hicklin | |
| 6,199,804 B1 | 3/2001 | Donofrio, Jr. | |
| 6,220,589 B1 | 4/2001 | Smith, III et al. | |
| 6,237,375 B1 | 5/2001 | Wymer | |
| 6,659,382 B2 | 12/2003 | Ryczek | |
| 6,690,277 B1 | 2/2004 | Hansen et al. | |
| 6,762,585 B2 | 7/2004 | Liao | |
| 6,848,662 B2 | 2/2005 | Paramonoff et al. | |
| 7,111,764 B2 | 9/2006 | Smith et al. | |
| 7,197,962 B2 | 4/2007 | Williams | |
| 8,240,628 B2 | 8/2012 | Huang | |
| 8,241,050 B2 | 8/2012 | Xu et al. | |
| 8,711,553 B2 | 4/2014 | Trinh et al. | |
| 8,833,716 B2 | 9/2014 | Funk et al. | |
| 8,864,089 B2 | 10/2014 | Hung | |
| 8,985,544 B1 | 3/2015 | Gulick, Jr. | |
| 9,039,785 B2 | 5/2015 | Gulick, Jr. | |
| 9,097,380 B2 | 8/2015 | Wheeler | |
| 9,117,351 B2 | 8/2015 | Gulick, Jr. et al. | |
| 9,285,832 B2 | 3/2016 | Galant | |
| 9,298,219 B2 | 3/2016 | Gulick, Jr. | |
| 9,568,141 B1 | 2/2017 | Zaloom | |
| 9,797,543 B2 | 10/2017 | Lin | |
| 9,890,899 B2 | 2/2018 | Theis et al. | |
| 9,936,823 B2 | 4/2018 | Galant | |
| 10,165,873 B2 * | 1/2019 | Gulick, Jr. | E05B 73/0082 |
| 10,448,759 B1 | 10/2019 | Chapuis et al. | |
| 10,851,935 B1 * | 12/2020 | Huang | G06F 1/1656 |
| 10,925,414 B2 | 2/2021 | Gulick, Jr. et al. | |
| 11,178,983 B1 * | 11/2021 | Kelsch | A47F 7/024 |
| 11,313,153 B2 * | 4/2022 | Gulick, Jr. | E05B 73/0082 |
| 11,363,895 B2 * | 6/2022 | Schutt | A47F 7/0246 |
| 2003/0106971 A1 | 6/2003 | Leyden et al. | |
| 2004/0141287 A1 | 7/2004 | Kim et al. | |
| 2004/0231376 A1 | 11/2004 | Leyden et al. | |
| 2004/0261473 A1 | 12/2004 | Avganim | |
| 2005/0001485 A1 | 1/2005 | Pail | |
| 2005/0028571 A1 | 2/2005 | Merrem et al. | |
| 2006/0187033 A1 | 8/2006 | Hall et al. | |
| 2007/0157495 A1 | 7/2007 | Yang | |
| 2008/0156836 A1 | 7/2008 | Wadsworth et al. | |
| 2008/0186686 A1 | 8/2008 | Buck et al. | |
| 2009/0079566 A1 | 3/2009 | Goldstein et al. | |
| 2009/0173863 A1 | 7/2009 | Crown | |
| 2010/0039715 A1 | 2/2010 | Xu et al. | |
| 2010/0079285 A1 | 4/2010 | Fawcett et al. | |
| 2010/0148030 A1 * | 6/2010 | Lin | B60R 11/0252 248/371 |
| 2010/0194568 A1 | 8/2010 | Irmscher et al. | |
| 2010/0264182 A1 | 10/2010 | Perlman et al. | |
| 2011/0133050 A1 * | 6/2011 | Eisenberger, Sr. | F16M 13/00 70/58 |
| 2012/0057293 A1 | 3/2012 | Detemple | |
| 2013/0206942 A1 | 8/2013 | Trotsky | |
| 2013/0318639 A1 | 11/2013 | Gulick, Jr. | |
| 2014/0263931 A1 | 9/2014 | Chen | |
| 2015/0060624 A1 | 3/2015 | Huang | |

FOREIGN PATENT DOCUMENTS

| | | |
|---|---|---|
| WO | WO2011032147 A2 | 3/2011 |
| WO | WO2013028971 A1 | 2/2013 |

* cited by examiner

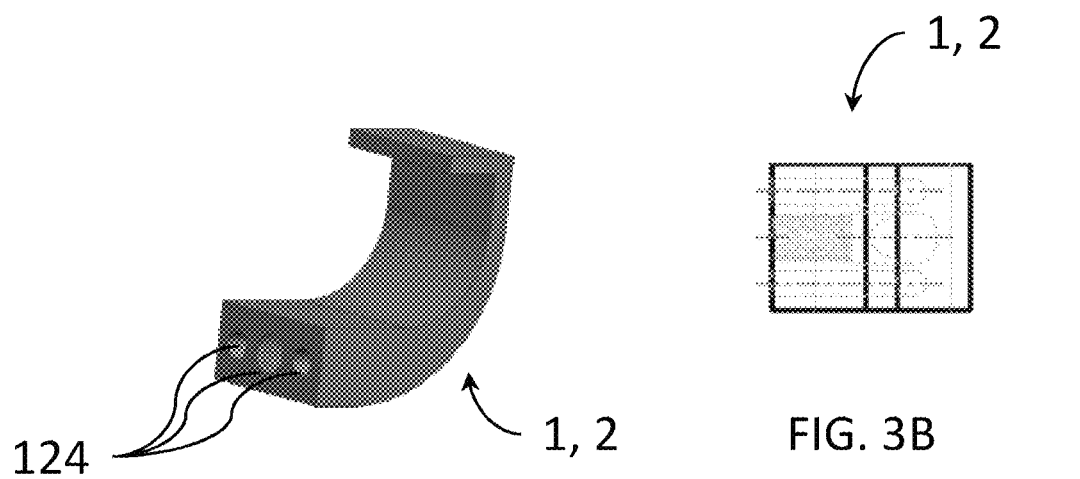
124    1, 2
FIG. 3A
1, 2
FIG. 3B
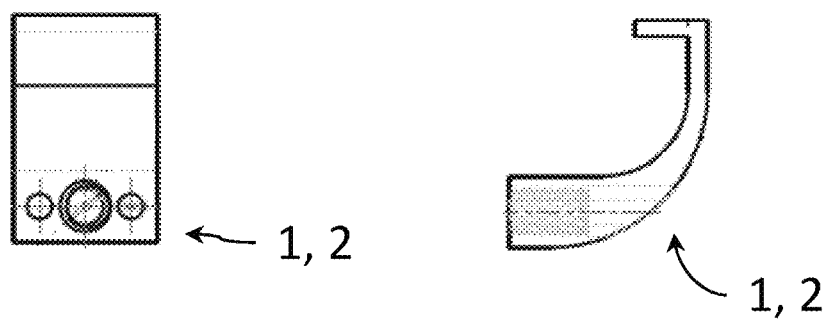
1, 2
FIG. 3C
1, 2
FIG. 3D

122

122

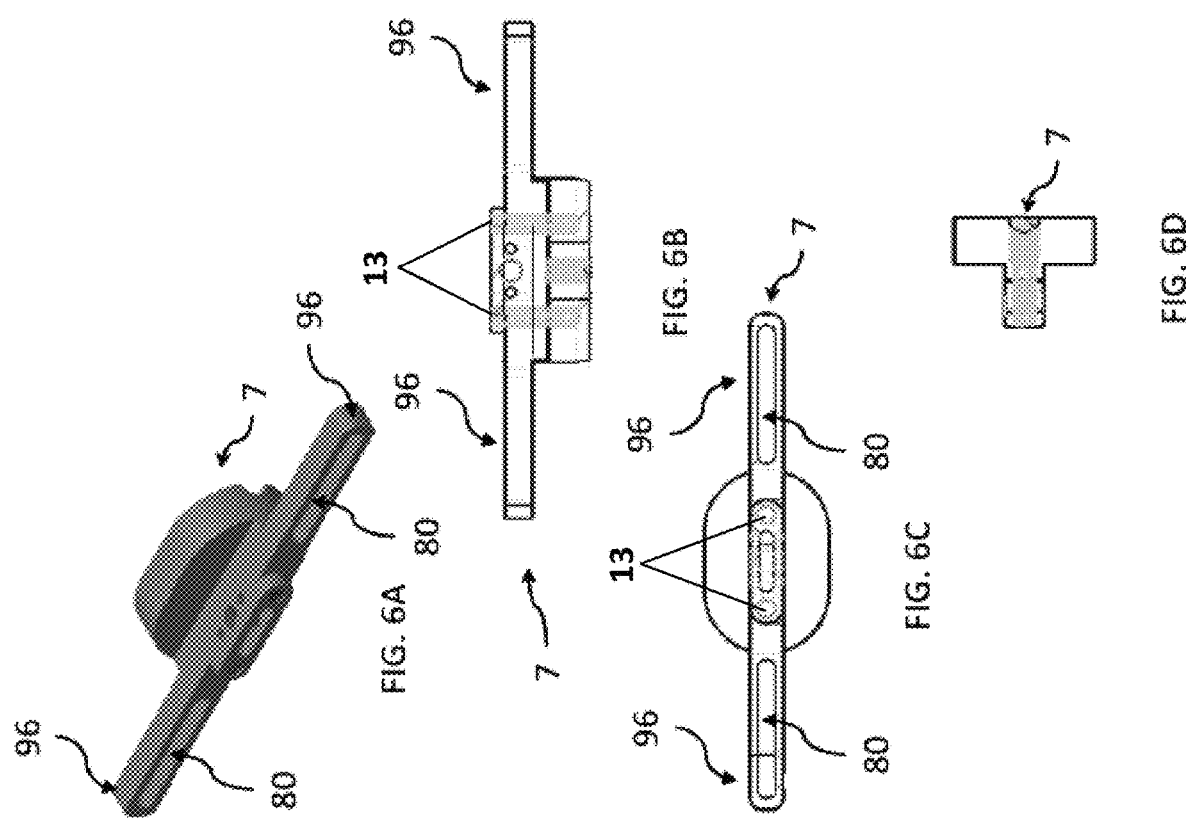

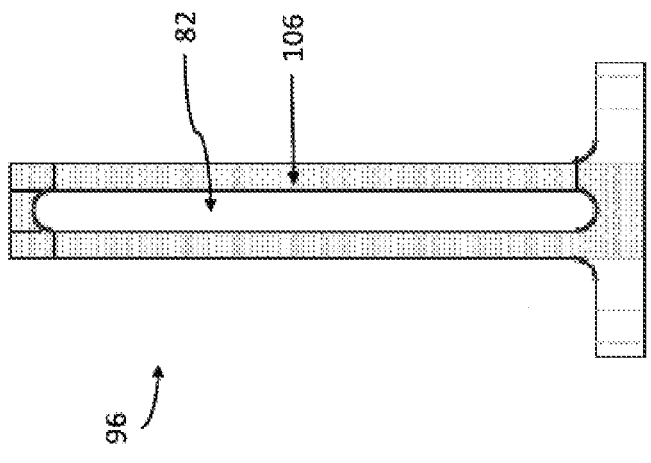
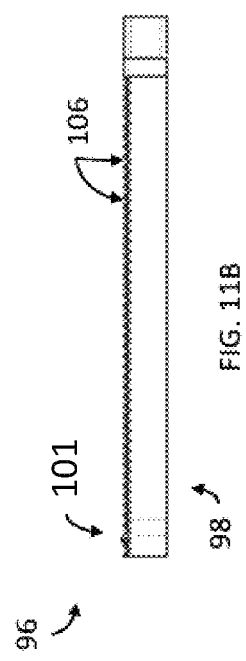
FIG. 11A
FIG. 11B

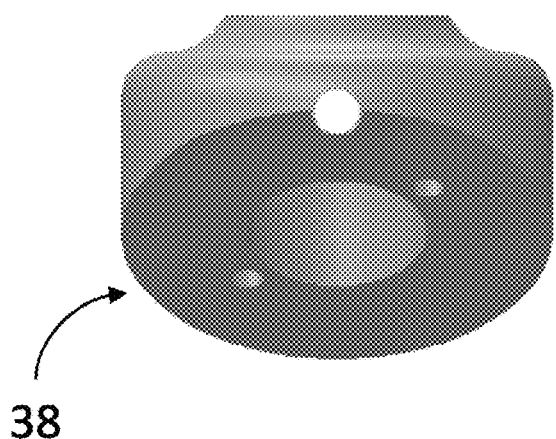
38
FIG. 21A
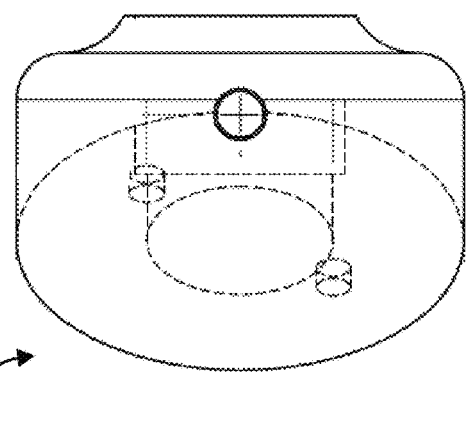
38  FIG. 21B
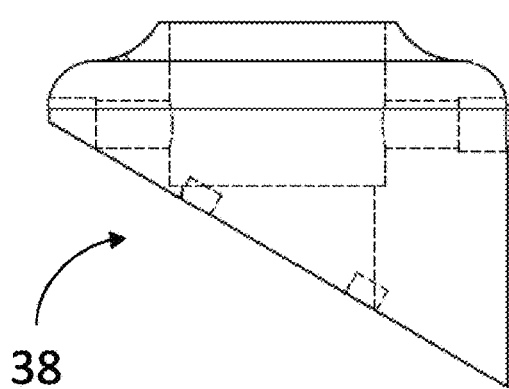
38
FIG. 21C
38
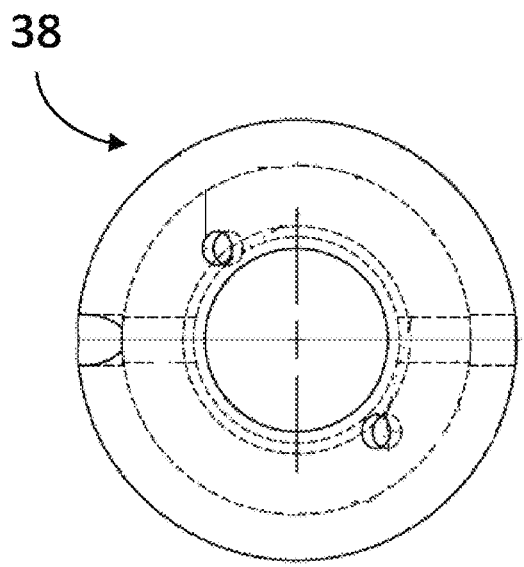
FIG. 21D

SECURITY DEVICE FOR FUNCTIONAL DISPLAY AND SECURITY OF HANDHELD ELECTRONIC DEVICES

CROSS-REFERENCE TO RELATED APPLICATION

This application is a continuation of, and claims the benefit and priority of U.S. patent application Ser. No. 16/233,356 filed on Dec. 27, 2018, which is a continuation of, and claims benefit and priority of U.S. patent application Ser. No. 15/238,831 filed on Aug. 17, 2016, which is a non-provisional of, and claims the benefit and priority of, U.S. Patent Application Ser. No. 62/206,007, filed Aug. 17, 2015. The entire contents of such applications are hereby incorporated herein by reference.

FIELD OF THE INVENTION

The invention relates to a security device for allowing functional and secure display of handheld electronic devices.

BACKGROUND OF THE INVENTION

Retailers sell handheld electronic devices to the public in a range of shapes and sizes, with a range of functionality. Encouraging customers to examine and use the functionality of the devices at display locations is a valuable marketing technique employed by retailers. To decrease the risk of theft associated with this marketing strategy, retailers employ various security measures.

One common security measure is the use of an alarm sensor that sets when placed in contact with the surface of the handheld electronic device and activates when it loses contact with the device (e.g., when the sensor is removed). A typical alarm sensor is attached to one portion of the handheld electronic device using an adhesive tape or similar adhesive product. During use, the adhesives often fail, resulting in the alarm sensor losing contact with the handheld electronic device and causing alarms to sound and startle innocent customers, negatively affecting their shopping experience. When these false alarms occur at a high frequency, retailers tend to ignore the alarms or even turn them off to avoid disrupting customer shopping experiences, leaving retailers vulnerable to theft. Furthermore, these alarm sensors are only activated when the alarm sensor loses contact with the portion of the handheld electronic devices to which it has been attached. For example, if the alarm sensor is attached to the battery cover of a wireless phone, a thief can remove and steal the remainder of the wireless phone (i.e., all components but the battery cover) without activating the alarm sensor. In order to combat this, retailers often install a plurality of alarm sensors in multiple locations on the handheld electronic devices (e.g., front and back, inside the battery compartment, etc.). These alarm sensors often hinder customer inspection of the device. In some cases, these alarm sensors installed within the handheld electronic devices can ignite when subjected to excessive heat within the devices.

BRIEF DESCRIPTION OF THE INVENTION

A security device and base for a mobile device. The security device includes a body, at least two sliding arms coupled to the body, and a leveling plate coupled to the body and configured to receive the mobile device.

In one embodiment of the invention, a security device for a mobile device is described. The security device includes a body having a first body extension, a second body extension, and an upper surface. A first guide track extends through the first body extension and a second guide track extends through the second body extension, the first guide track positioned opposite the second guide track. A first sliding arm is coupled to the first guide track. The first sliding arm has a distal end, with a first retention member extending substantially horizontally from the distal end of the first sliding arm above a plane of the upper surface of the body. A second sliding arm is coupled to the second guide track, opposite the first sliding arm. The second sliding arm has a distal end from which a second retention member extends substantially horizontally above the plane of the upper surface of the body. A leveling plate is configured to receive the mobile device. The leveling plate is coupled to a component of the security device using one or more leveling screws to allow the leveling plate to move along a Z-axis relative to the upper surface of the body.

In another embodiment, a security device for a mobile device is described. The mobile device includes a body having a first body extension, a second body extension, a third body extension, a fourth body extension, and an upper surface. A first guide track extends through and along a length of the first body extension, a second guide track extends through and along a length of the second body extension, a third guide track extends through and along a length of the third body extension, and a fourth guide track extends through and along a length of the fourth body extension. The first guide track is positioned opposite the second guide track and the third guide track is positioned opposite the fourth guide track. A first sliding arm is coupled to the first guide track. The first sliding arm has a distal end with a first retention member extending substantially horizontally from the distal end of the first sliding arm above a plane of the upper surface of the body. A second sliding arm is coupled to the second guide track, opposite the first sliding arm. The second sliding arm has a distal end with a second retention member extending substantially horizontally from the distal end of the second sliding arm above the plane of the upper surface of the body. The first sliding arm and the second sliding arm define a first opposing pair of sliding arms. A third sliding arm is coupled to the third guide track. The third sliding arm has a distal end with a third retention member extending substantially horizontally from the distal end of the third sliding arm above a plane of the upper surface of the body. A fourth sliding arm is coupled to the fourth guide track, opposite the third sliding arm. The fourth sliding arm has a distal end with a fourth retention member extending substantially horizontally therefrom above the plane of the upper surface of the body. The third sliding arm and the fourth sliding arm define a second opposing pair of sliding arms extending substantially perpendicularly to the first opposing pair of sliding arms. A leveling plate is configured to receive the mobile device. The leveling plate is coupled to a component of the security device using one or more leveling screws to allow the leveling plate to move along a Z-axis relative to the upper surface of the body.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description.

This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. The drawings are not necessarily to scale, emphasis generally being placed upon illustrating the features of certain embodiments of the invention. Thus, for further understanding of the nature and objects of the invention, references can be made to the following detailed description, read in connection with the drawings in which:

FIGS. 3A-3D are illustrative views of a moveable arm of the security device of FIG. 1;

FIGS. 6A-6D are illustrative views of a body of the security device of FIG. 1;

FIGS. 11A-B are illustrative views of a body extension of the security device of FIG. 9;

FIGS. 21A-21D are illustrative views of an angled holder of the base of FIG. 18;

DETAILED DESCRIPTION OF THE INVENTION

Figure 1:
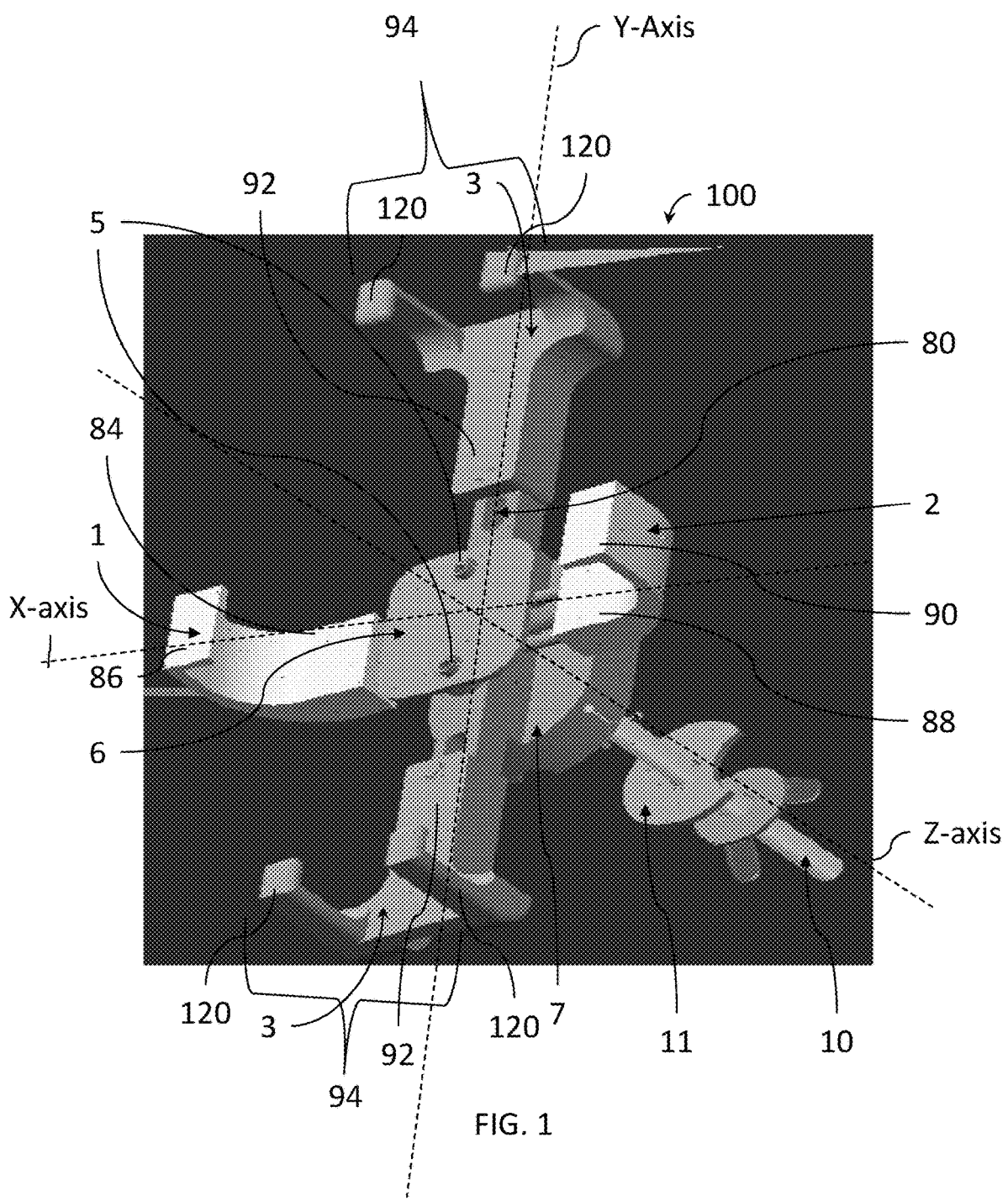
FIG. 1 is a perspective view of an embodiment of a security device having two sliding arms.
Figure 2:
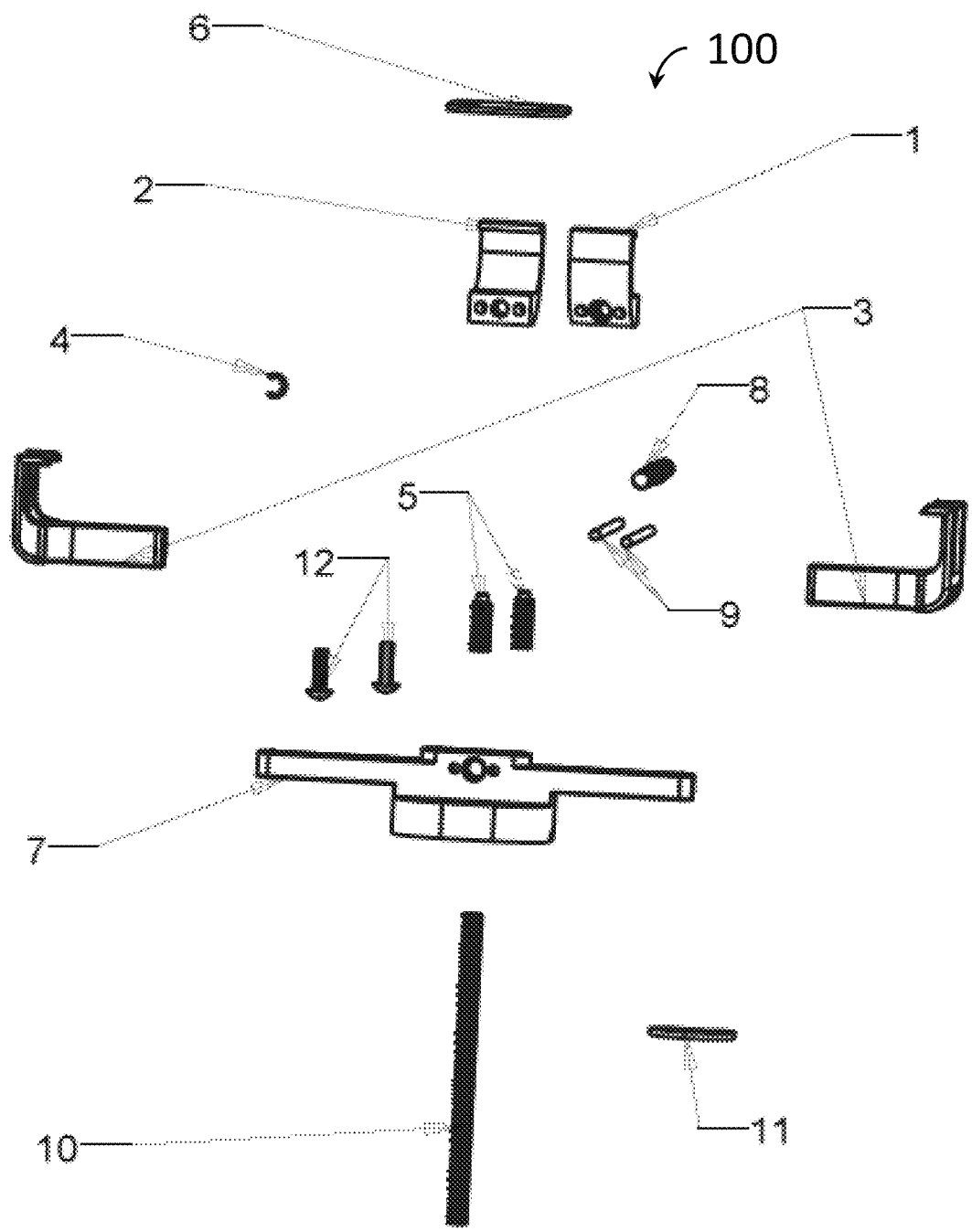
FIG. 2 is an exploded assembly view of an embodiment of the security device of FIG. 1.
Figure 4A:
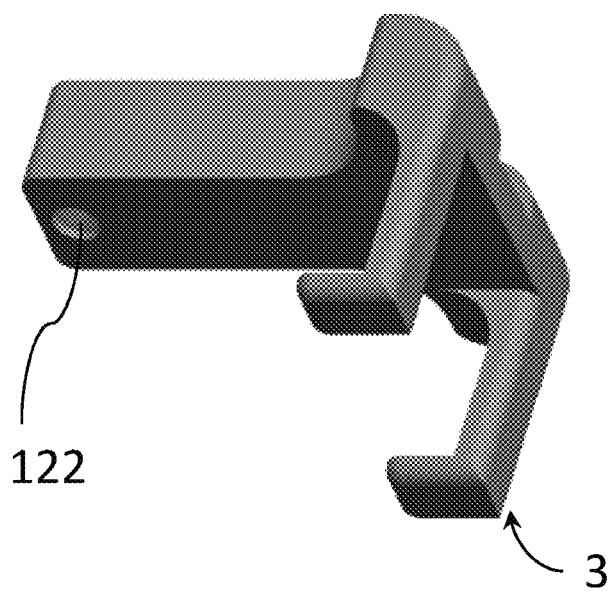
FIGS. 4A-4C are illustrative views of a sliding arm of the security device of FIG. 1.
Figure 4B:
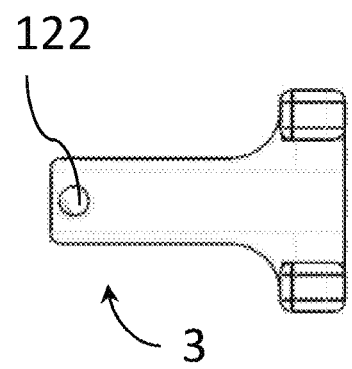
Figure 4C:
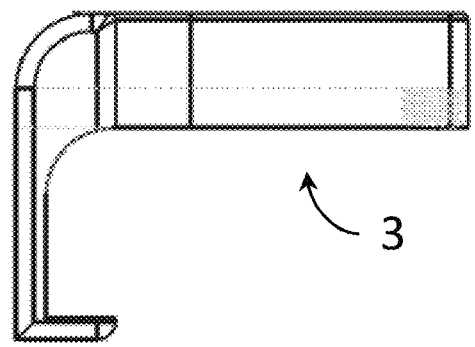
Figure 5A:
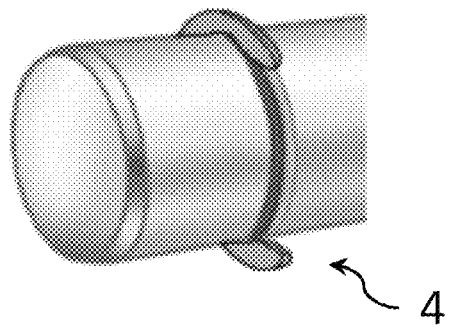
FIGS. 5A-5B are illustrative views of an external retaining ring of the security device of FIG. 1.
Figure 5B:
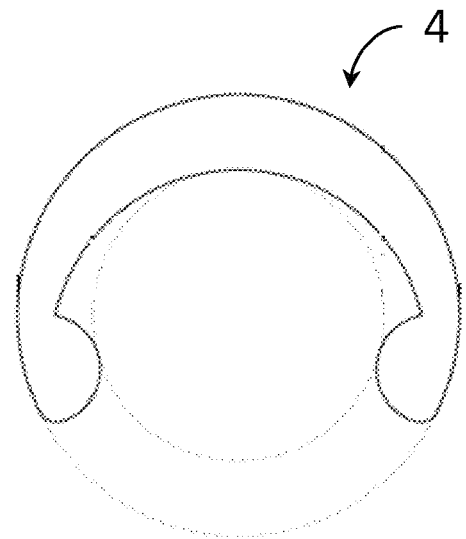
Figure 7:
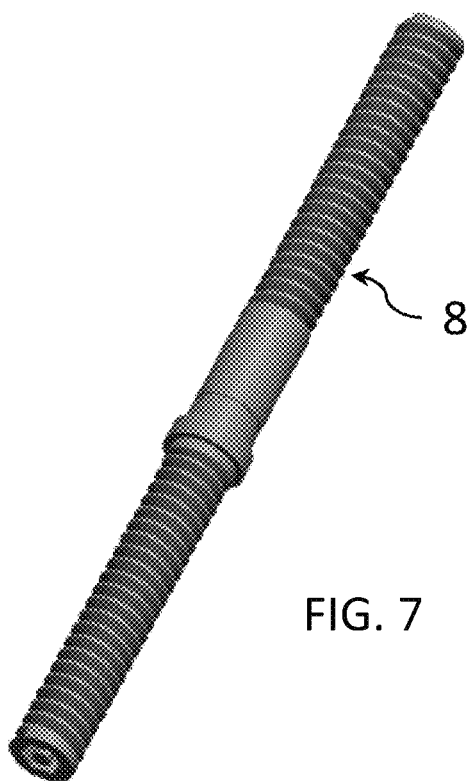
FIG. 7 is an illustrative view of an axle of the security device of FIG. 1.

FIG. 1 is an exploded perspective view of an exemplary embodiment of a security device 100, including two sliding arms 3, for functional display and security of a handheld mobile electronic device (not shown). FIG. 2 is an exploded assembly view of the security device 100, with the components shown in FIG. 2 further illustrated by FIGS. 3A-8. The security device 100 includes a first 1 and second 2 moveable arm and at least two sliding arms 3, each of which couple to a housing body 7. The first moveable arm 1 includes a first arm base 84 at its proximal end and has a first retention member 86 extending substantially from the distal end of the first moveable arm 1 above the plane of the upper surface of the housing body 7. The second moveable arm 2 includes a second arm base 88 at its proximal end and has a second retention member 90 extending substantially from the distal end of the second moveable arm 2 above the plane of the upper surface of the body 7. Each of the at least two sliding arms 3 includes a third arm base 92 at its proximal end and has a third retention member 94 extending substantially from the distal end of each of the sliding arms 3 above the plane of the upper surface of the body 7. In one embodiment, at least one of the first, second, and third retention members 86, 90, 94 can be formed by a single retention hook 120. In another embodiment, at least one of the first, second, and third retention member 86, 90, 94 can be formed by a plurality of retention hooks 120, such as by two retention hooks 120.

Figure 9:
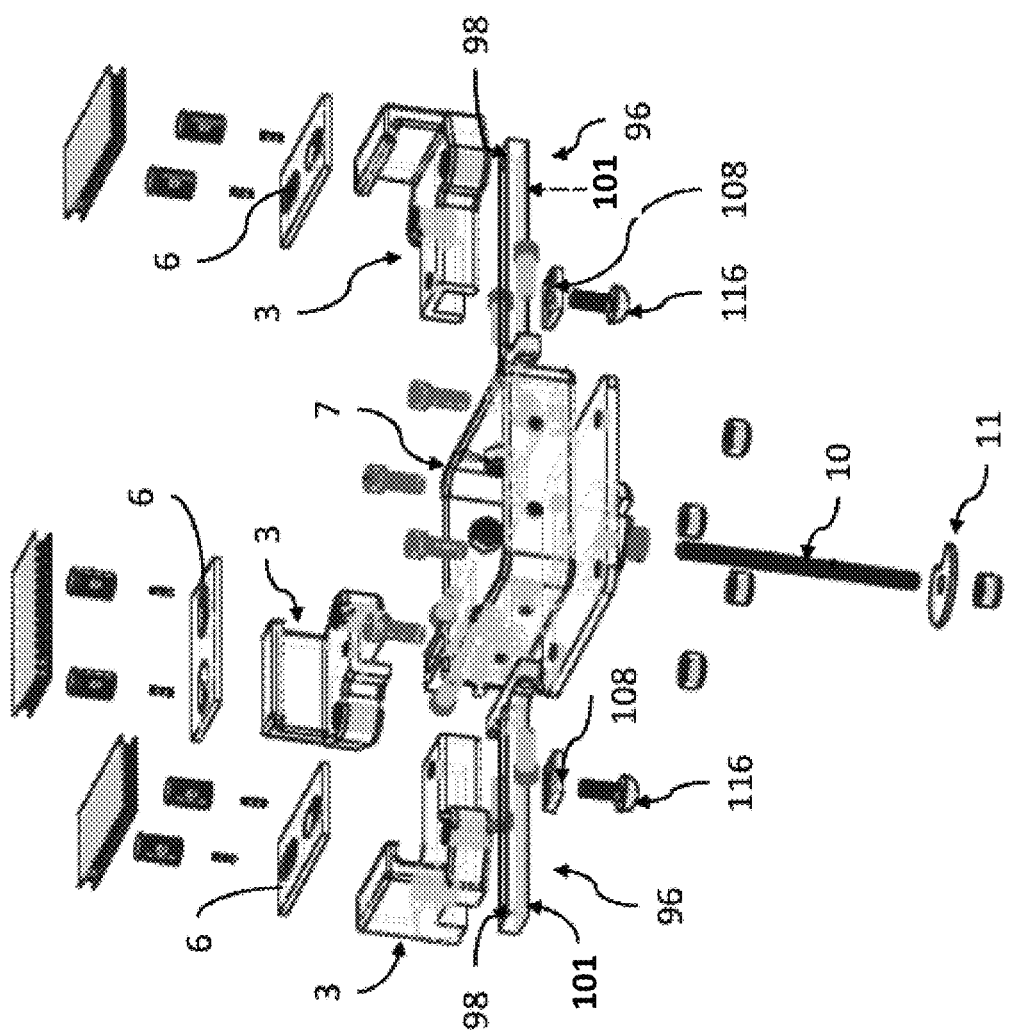
FIG. 9 is an exploded assembly view of an embodiment of a security device having three sliding arms.
Figure 10A:
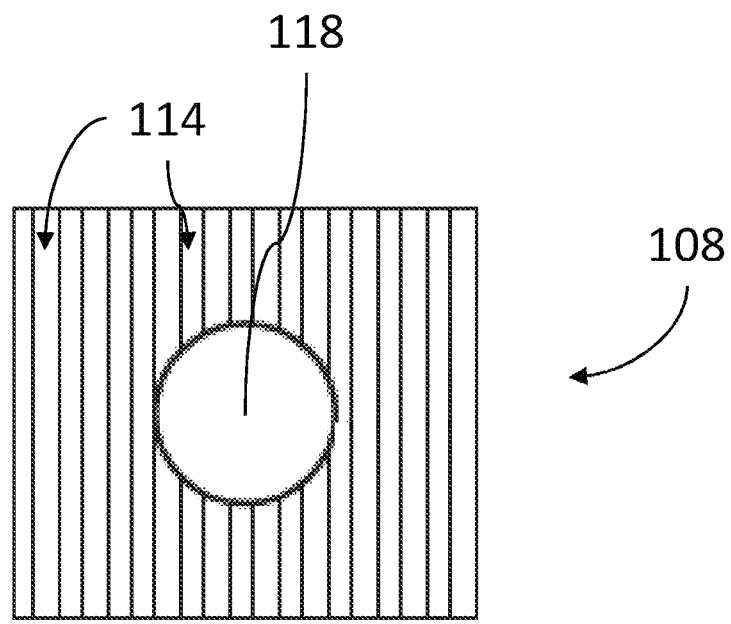
FIGS. 10A-10B are illustrative views of a locking plate of the security device of FIG. 9.
Figure 10B:
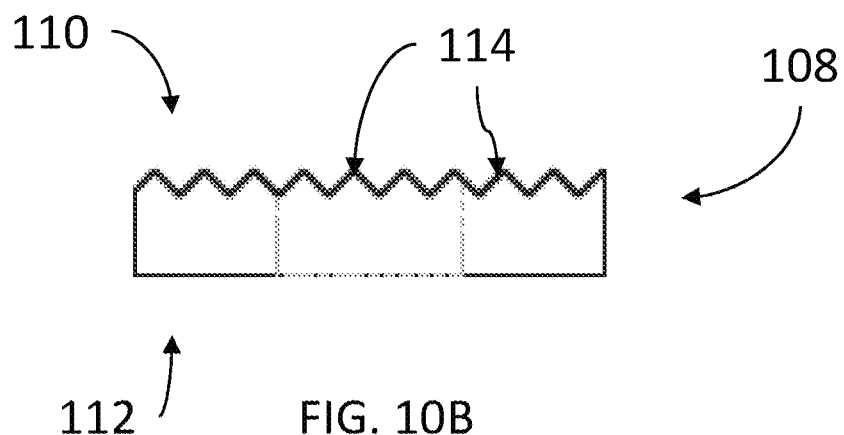

In an embodiment, the body 7 includes at least two body extensions or legs 96 (FIGS. 6A-6C), to each of which a sliding arm 3 is coupled. The body extensions 96 can be integral with the body (FIG. 1) or the body extensions 96 can be separate components that are coupled to the body 7 (FIG. 9). In this embodiment, a guide groove or track 80 (FIGS. 6A, 6C) extends through each of the at least two body extensions, to which each of the at least two sliding arms 3 couple. The track 80 can act as a guide for movement of each sliding arm 3 along the body 7. For example, the tracks 80 can extend through the body extension 96 along a length of the body extension 96. A fastener 12 can extend through an aperture 122 in each sliding arm 3 and the respective track 80 to couple the sliding arm 3 to the track 80. The body extension 96 can have a smooth surface so that the sliding arm 3 slides smoothly along the track 80. When the sliding arm 3 reaches the desired position along the track 80, the fastener can lock the sliding arm 3 in position on the track 80.

In another embodiment, illustrated by FIGS. 9-11B, the body 7 includes three body extensions 96, to each of which a sliding arm 3 is coupled. The body extensions 96 can be integral with the body (FIG. 1) or the body extensions 96 can be separate components that are coupled to the body 7 (FIG. 9). In an embodiment, each body extension 96 has a T-shape. Each body extension 96 has a top or upper surface 98 and a bottom or lower surface 101 and a groove or track 80 (FIG. 11A) extending therethrough and along a length of the body extension 96. In the illustrated embodiment, the lower surface 101 of each body extension 96 has a plurality of teeth or ridges 106 (FIGS. 11A-11B) formed thereon along the length of the body extension 96 around the track 80. A locking plate 108 with a generally rectangular shape has an upper surface 110 and a lower surface 112 (FIGS. 10A-10B). The upper surface 110 of the locking plate 108 has a plurality of teeth or ridges 114 formed thereon. The upper surface 110 of the locking plate 108 contacts the lower surface 101 of the body extension 96 such that the teeth 114 of the locking plate 108 interlock with the teeth 106 of the body extension 96. A fastener 116 can extend through an aperture 118 in the locking plate 108 and the track 80 of the body extension 96 into the respective sliding arm 3. In this embodiment, the fastener 116 can be loosened to allow the sliding arm 3 and locking plate 108 to slide along the body extension 96. When the sliding arm 3 reaches the desired location, the fastener 116 can be tightened so that the teeth 114 of the locking plate 108 interlock with the teeth 106 of the body extension 96 to lock the sliding arm 3 in position.

In an embodiment, the security device can include as many locking plates 108 as body extensions 96. For example, the security device can include two (2), three (3), or four (4) body extensions, with a corresponding number of locking plates. The number of body extensions can be determined based on the design of the mobile device to be retained by the security device.

Returning to FIGS. 1-3D and 7, the horizontal movement (i.e., extending and retracting) of the first moveable arm 1 and second moveable arm 2 along the X axis is controlled by the rotation of an axle 8, which extends through the first side and the second side of the body 7 and includes two threaded ends, each of which is machined with a thread pattern that is counter rotational to the other. Correspondingly, a threaded hole in each of the first moveable arm 1 and the second moveable arm 2 are each machined with a thread pattern that is counter rotational to the other. In operation, one threaded end of the axle 8 is complementary to and inserted in the threaded hole of the first moveable arm 1, while the second threaded end of the axle 8 is complementary to and inserted in the threaded hole of the second moveable arm 2. The axle 8 is held in place by axle snap rings 4, which are attached at opposing end portions of the axle 8 and so positioned to abut the side walls of the body 7.

The rotation of axle 8 is controlled by inserting a suitable tool into a hex key hole at the tip of the axle 8. Screwing the tool screws the opposing threaded ends of the axle into the threaded holes of the moveable arms 1, 2, respectively, which serves to move the first moveable arm 1 and second moveable arm 2 towards one another, and retracting towards the center of the body 7. Conversely, when the axle 8 is rotated in a counter clockwise direction, the first moveable arm 1 and second moveable arm 2 are moved away from each other, and extending away from the center of the body 7. In this fashion, the first moveable arm 1 and the second moveable arm 2 can be infinitely adjusted to clamp onto and securely hold the sides and top edges of a handheld electronic device.

Guiding pins 9 (FIG. 2) are fixedly attached to the moveable arms 1, 2. Each guiding pin 9 extends through a guide hole 124 (FIG. 3A). Each pin 9 is parallel to the axis of the axle 8, and in the same plane thereof. As the axle 8 is rotated, thereby moving first moveable arm 1 and second moveable arm 2 into a wider or narrower adjustment state, the guiding pins 9 slide correspondingly through the guide holes. The guiding pins 9 function as stabilizer means to prevent the moveable arms 1, 2 from deviating from their fixed alignment, which in turn maintains the perpendicular alignment of the first moveable arm 1 and the second moveable arm 2 as they move through various states of adjustment as described above. While the exemplary embodiment shown in FIGS. 1-8 has two locator pins 9 per arm 1, 2, each arm 1, 2 can have more or less guiding pins 9.

The security device 100 also includes a mounting rod 10 coupled to the body 7 and configured to be received in a base 104, described below with reference to FIGS. 18-21D. A washer 11 is positioned on the mounting rod 10 for tightening the body 7 to a base receiver, discussed below. The security device 100 additionally includes a leveling plate 6, leveling plate stud(s) 5, and screw(s) 12. The mobile device is coupled to the leveling plate 6, which couples to the body 7 using the leveling plate studs 5. In an embodiment, illustrated in FIG. 1, the leveling plate 6 is coupled to the body 7. In another embodiment, illustrated in FIG. 9, a leveling plate 6 can be coupled to each sliding arm 3. In yet another embodiment, not illustrated, a leveling plate 6 can be coupled to the body 7 and to each sliding arm 3. The number and position of the leveling plate(s) 6 can be determined based on the design of the mobile device to be displayed. The leveling plate stud 5 and the screws 12 are configured to couple to the body such that the leveling plate stud 5 and the screws 12 are not accessible when the security device 100 is received in the base.

Vertical movement of the leveling plate 6 along the Z axis is controlled by the rotation of one or more of the threaded leveling plate studs 5, which can be fixedly attached to the leveling plate 6. The leveling plate studs 5 can be fasteners, such as screws. Here, it is important to note that while the leveling plate studs 5 are fixedly attached to the leveling plate 6, the leveling plate studs 5 are attached in a manner that allows the full and unencumbered rotation of the threaded leveling plate studs 5 in both clockwise and counter clockwise directions. When the leveling plate studs 5 are rotated clockwise into threaded holes 13, the leveling plate studs 5 rise along the threads of threaded holes 13 in the body 7, thereby elevating the end of the leveling plate studs 5 that are fixedly attached to the leveling plate 6. The threaded holes 13 are built up on the bottom of the body 7 to accept the leveling plate studs 5. In this manner, the leveling plate 6 may be elevated in a gradual and controlled manner. Conversely, when the threaded leveling plate studs 5 are rotated in a counter-clockwise direction, the leveling plate 6 is lowered along the threads of the threaded holes 13 in a likewise gradual and controlled manner. Each end of the leveling plate 6 may be raised or lowered, by alternate turn, in graduated increments, thereby raising or lowering the plate 6 in a level manner. This allows the leveling plate 6 to function substantially as a screw type jack to elevate the handheld electronic device and press it securely against the arms 1, 2, and 3, thereby holding the device fixedly between the leveling plate 6 and the arms 1, 2, 3.

Figure 8:
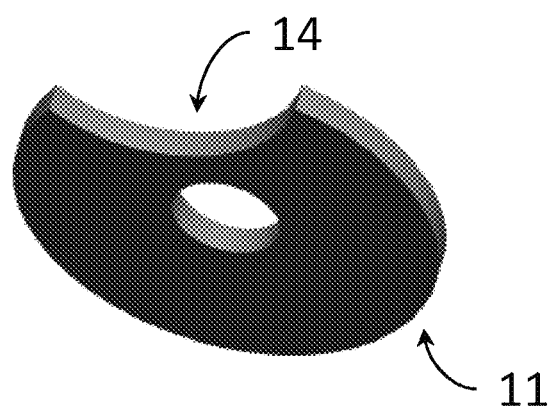
FIG. 8 is an illustrative view of a mounting washer of the security device of FIG. 1.

While the features of the security device 10 described above provide sufficient security against removing the handheld electronic device 8 from the security device 10, retailers often want additional security and functionality from their display devices. For example, if a tether or other cord holding the security device 10 were cut, absent other security features, a thief may be able to remove handheld electronic device perhaps without the knowledge of the retailer. To provide additional security, in one embodiment of the invention, an alarm sensor (not shown) is provided on the leveling plate 6 that sets when placed in contact with the surface of the handheld electronic device and will activate when the alarm sensor loses contact with the device or is otherwise tampered with. The alarm sensor can generate any suitable type of alarm, such as a visual alarm, an audible alarm, or a combination of a visual and audible alarm. A number of different types of alarm sensors can be used, such as a tape-style or a plunger-style sensor. A cable (e.g., containing two wires) can connect the alarm sensor to a printed circuit board (PCB). The cable should be long enough to allow the leveling plate 6 to move vertically as required. As illustrated in FIG. 8, the washer 11 includes a cutout section 14, such as a semi-circular cutout section, configured to permit passage of electronic cables, such as the charging cable or the alarm cable.

Figure 19:
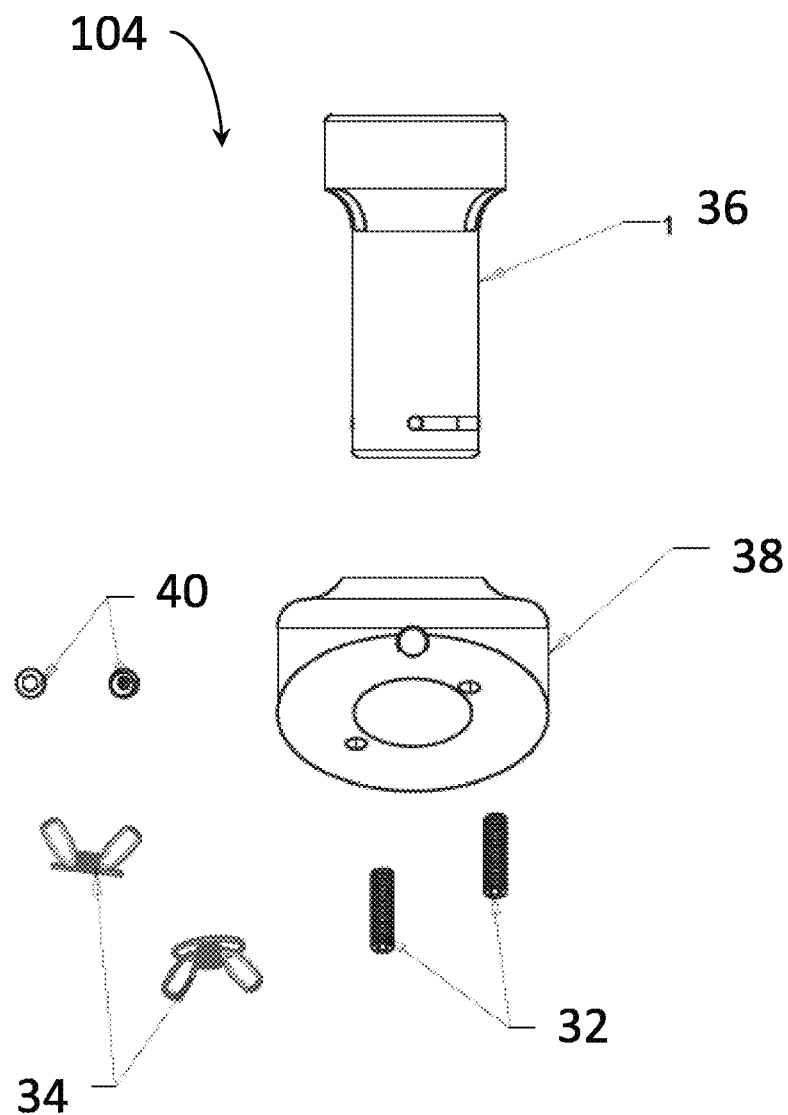
FIG. 19 is an exploded assembly view of the base of FIG. 18.
Figure 20A:
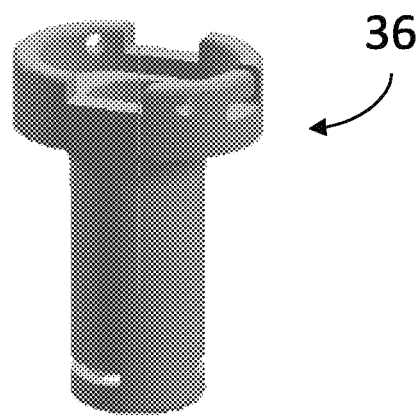
FIGS. 20A-20D are illustrative views of a security mount receiver of the base of FIG. 18.
Figure 20B:
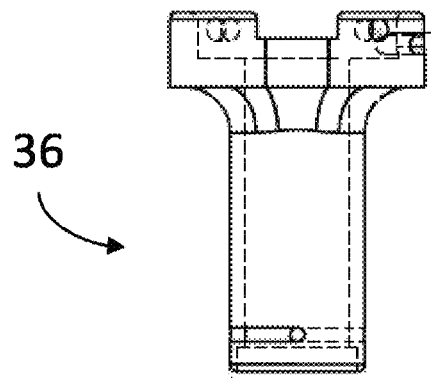
Figure 20C:
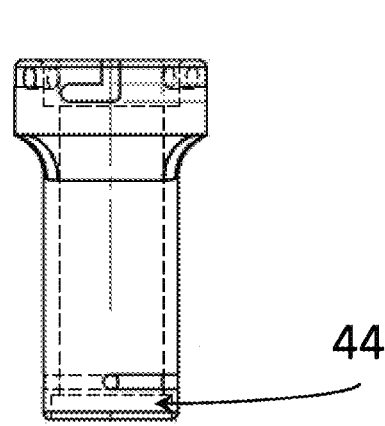
Figure 20D:
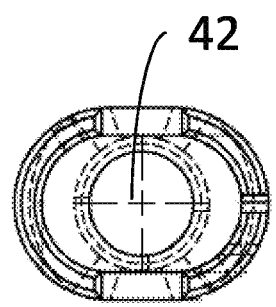

FIGS. 12-17C illustrate another embodiment of a security device 102 including four sliding arms 15, 16, 17, 18. The sliding arms 15, 16, 17, 18 couple to tracks 82 in the body 19 with fasteners 20, such as screws. A mounting rod 22 is coupled to a rear face of the body 19 and is configured to be received in a base 104 (FIG. 19). A mounting washer 24 is positioned on the mounting rod 22 and a wing nut 26 is also positioned on the mounting rod 22 for tightening the security device 102 to the base 104. Similar to the mounting washer 11 described with regard to FIGS. 1 and 8 above, the mounting washer 24 includes a cutout portion, such as a semi-circular cutout portion, to allow passage of electronic cables. The security device 102 additionally includes a leveling plate 28, which couples to the body 19 with leveling plate stud(s) 30. The leveling studs 30 can be adjusted to capture the mobile device between the leveling plate 28 and the arms 15, 16, 17, 18.

Figure 18:
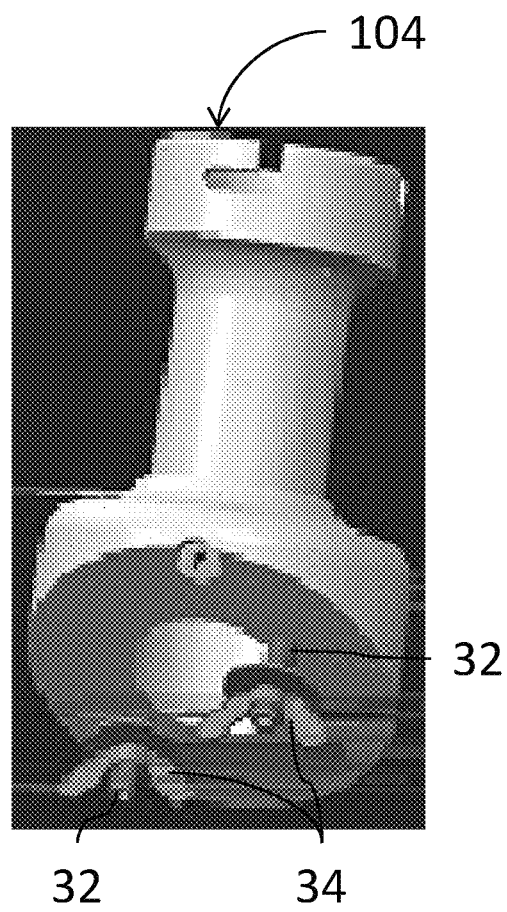
FIG. 18 is a perspective view of an embodiment of a base of a security device.

FIG. 18 is a perspective view of a base 104 in which the security devices 100, 102 described above can be received. The base 104 includes fasteners 32 and wing nuts 34, which are configured to couple the base 104 to a mounting surface. The fasteners 32 are configured to extend through the mounting surface and the wing nuts 34 threadably engage the fasteners 32 to tighten the base 104 to the mounting surface. The mounting surface can be configured such that when the base 104 is mounted to the mounting surface, the fasteners 32 and wing nuts 34 are inaccessible to a customer.

Figure 12:
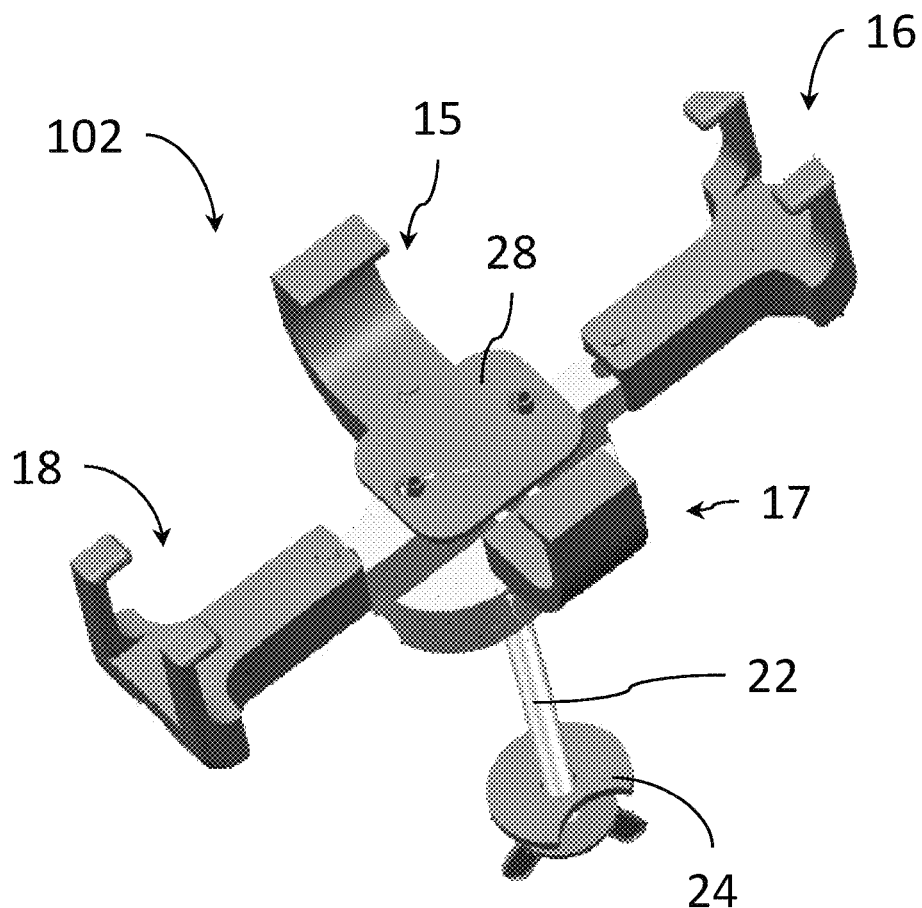
FIG. 12 is a front perspective view of an embodiment of a security device having four sliding arms.
Figure 13:
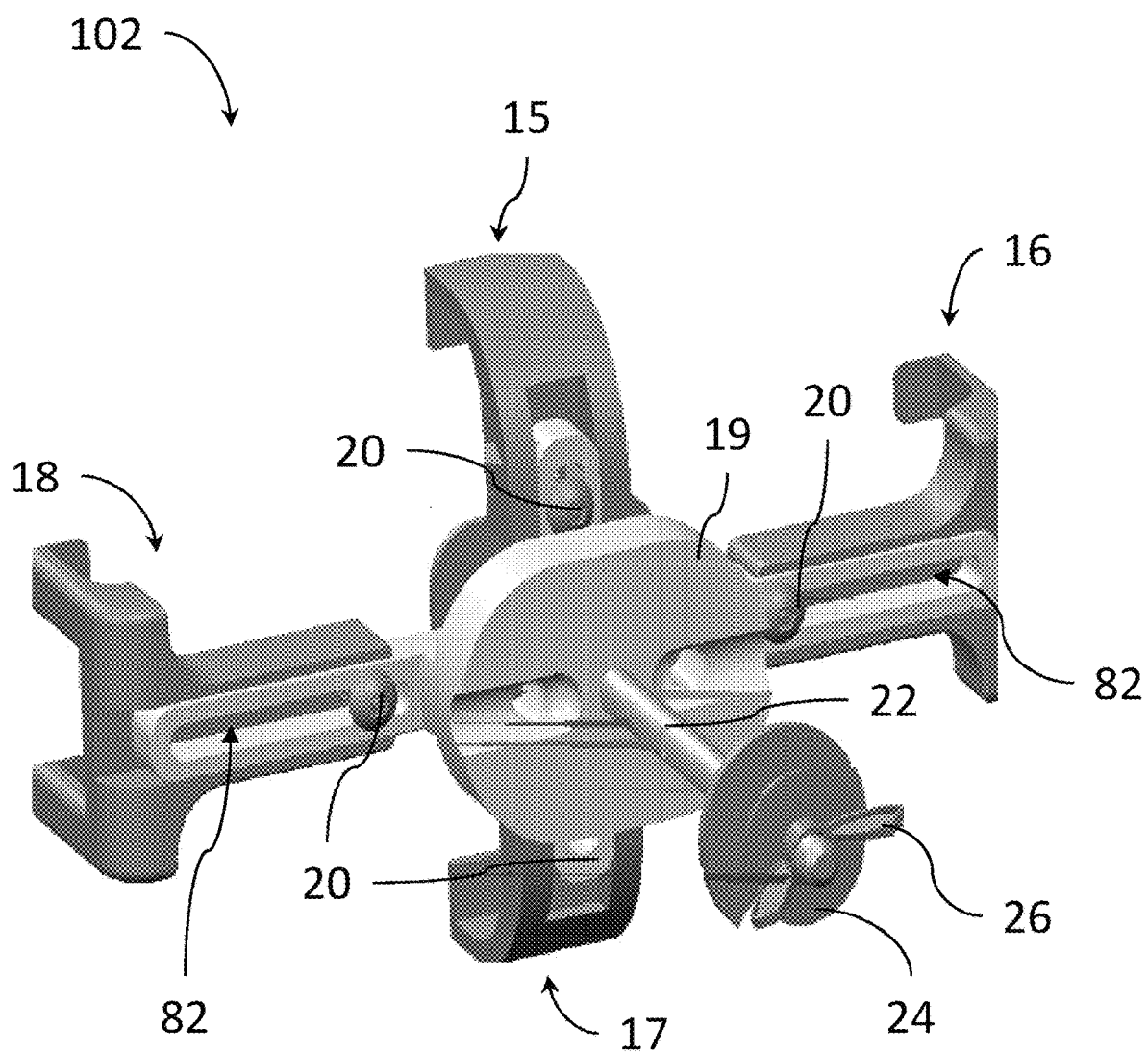
FIG. 13 is a rear perspective view of the security device of FIG. 12.
Figure 14:
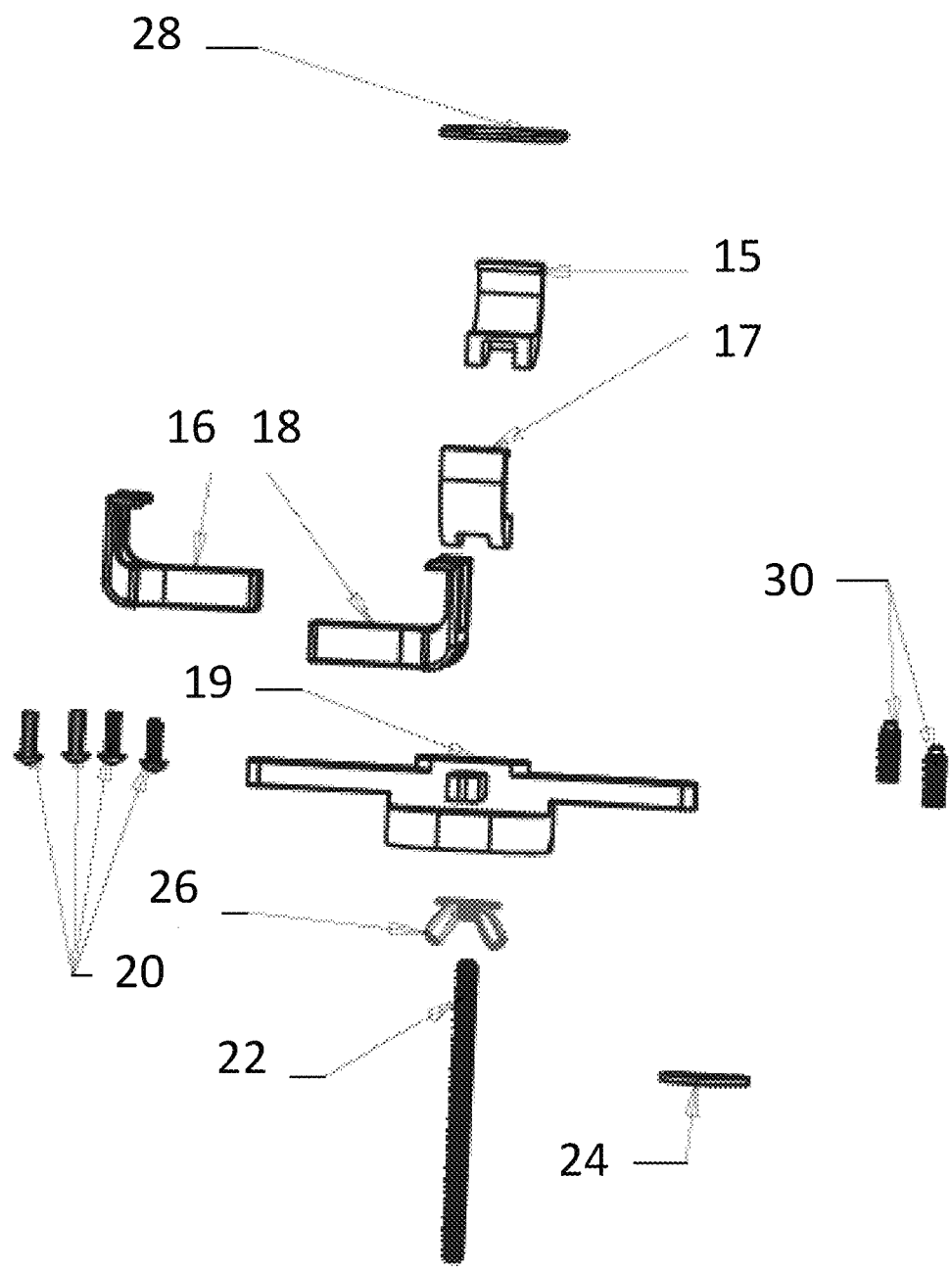
FIG. 14 is an exploded assembly view of the security device of FIG. 12.
Figure 15A:
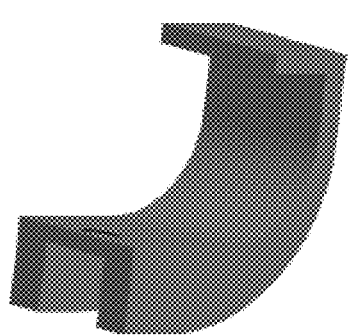
FIGS. 15A-15D are illustrative views of a sliding arm of the security device of FIG. 12.
Figure 15B:
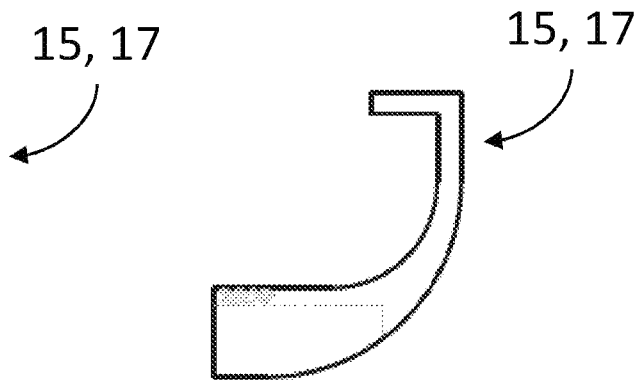
Figure 15C:
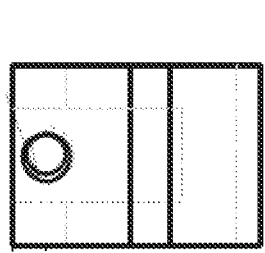
Figure 15D:
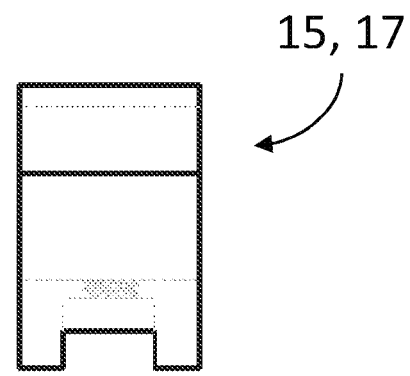
Figure 16A:
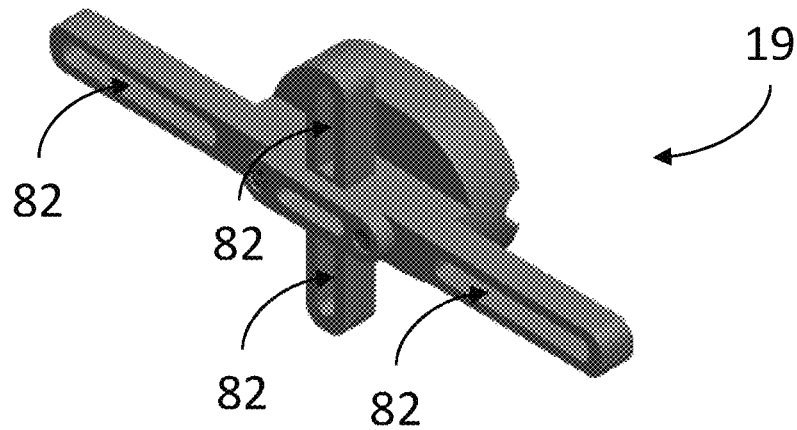
FIGS. 16A-16D are illustrative views of a body of the security device of FIG. 12.
Figure 16B:
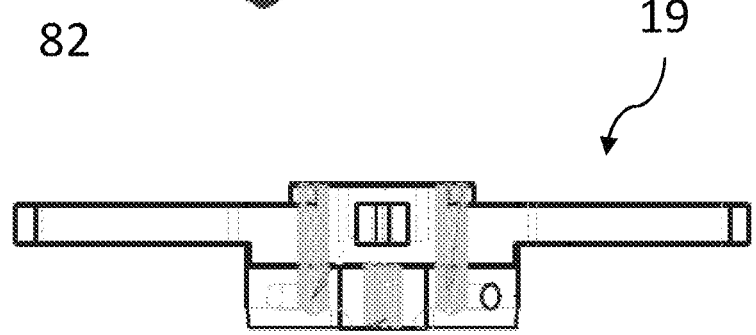
Figure 16C:
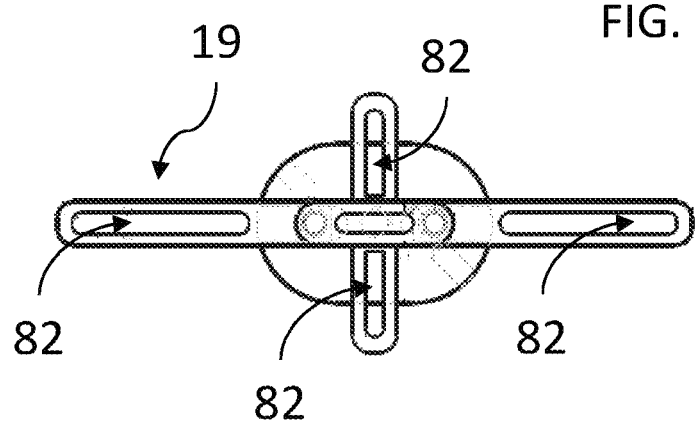
Figure 16D:
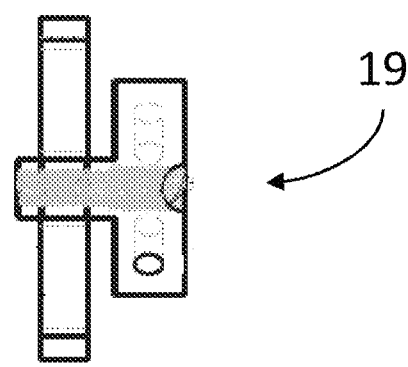
Figure 17A:
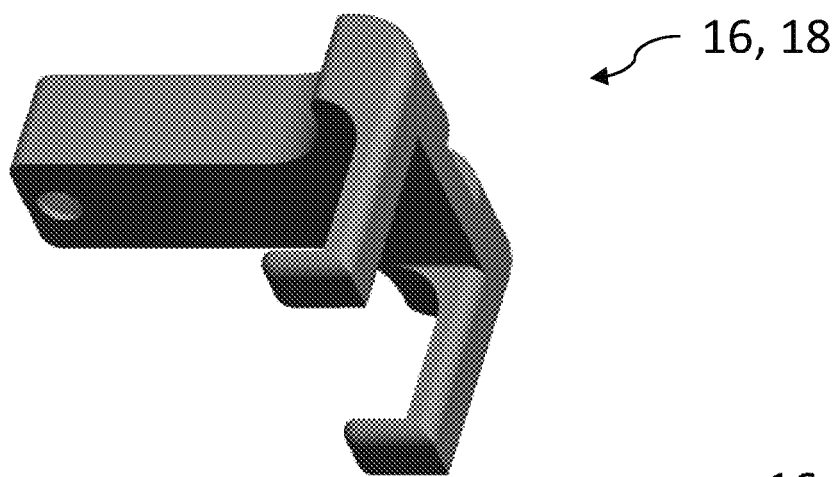
FIGS. 17A-17C are illustrative views of a sliding arm of the security device of FIG. 12.
Figure 17B:
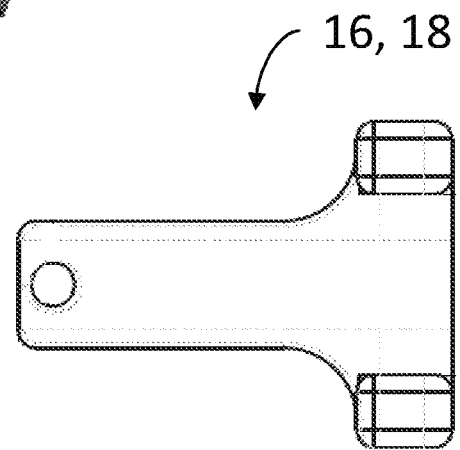
Figure 17C:
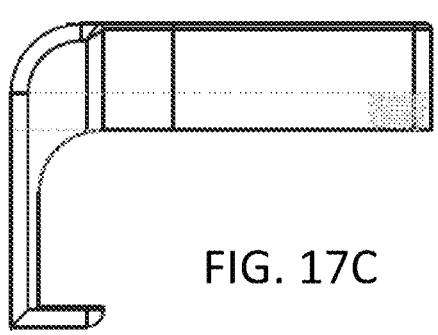

As illustrated by FIG. 19, a receiver 36 couples to a base body 38. Fasteners 40 can couple the receiver 36 to the base body 38. The receiver 36 is configured to receive a security device 100, 102 (FIGS. 1, 12, 13). The receiver 36 includes a central aperture 42 (FIG. 20D) through which the mounting rod 10, 22 of the security device 100, 102 extends. The mounting washer 11, 24 is received in a recess or counterbore 44 (FIG. 20C) located at the bottom of the receiver 36 and the wing nut 26 engaged to couple the security device 100, 102 to the receiver 36. In particular, as the wing nut 26 is rotated, the washer 11, 24 is pushed into and against the counterbore 44 and forms the bottom of the receiver 36, creating tension to allow the wing nut 26 to pull the mounting rod 10, 22 into the receiver 36.

Upon coupling the security device 100, 102 to the receiver 36, the receiver 36 is coupled to the base body 38 and the base body 38 is coupled to a mounting surface. When the security device 100, 102 is coupled to the receiver 36 and the base body 38, the mounting rod 22 and the wing nut 26 are concealed within the receiver 36 and are inaccessible to a customer.

Figure 22:
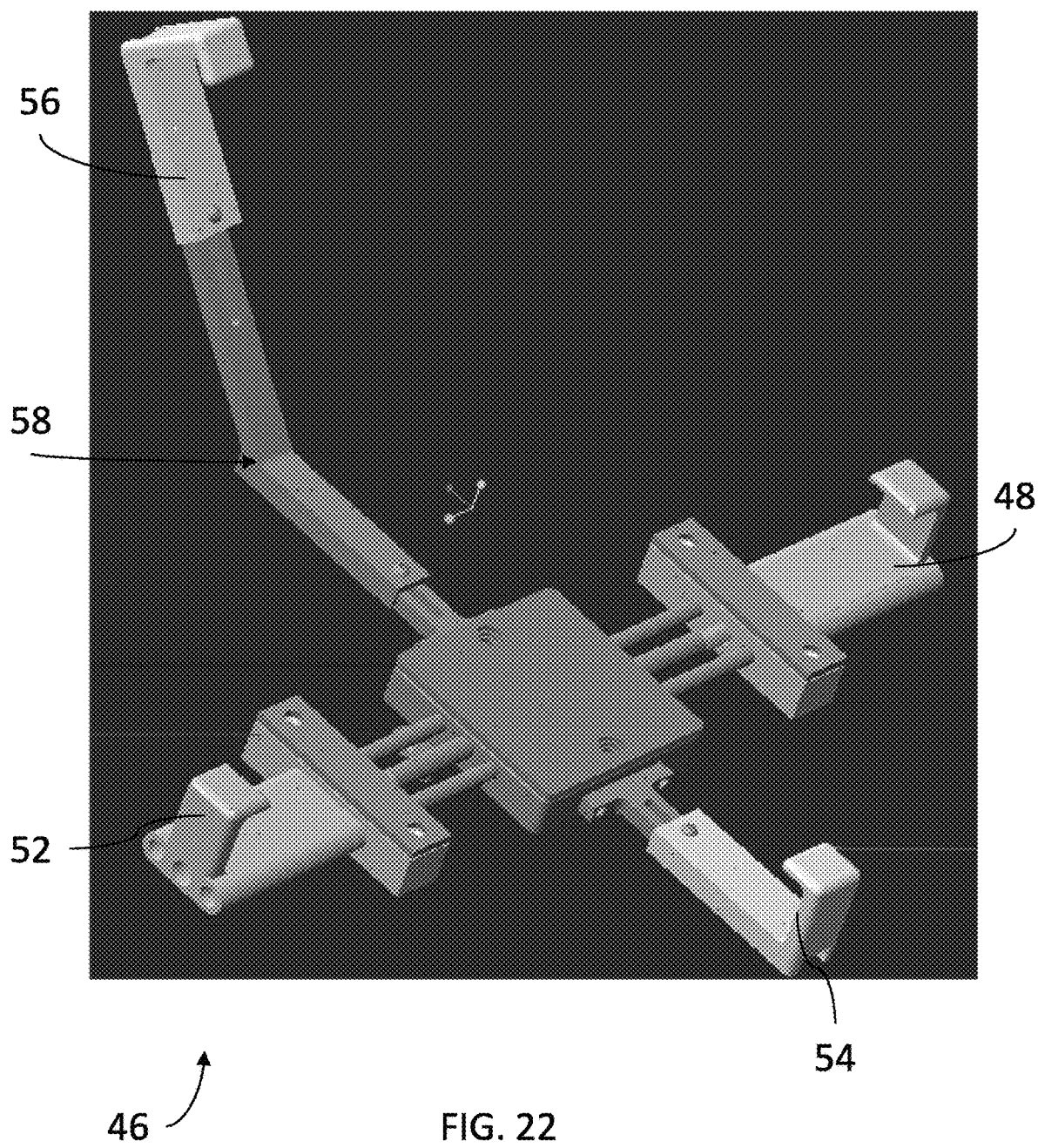
FIG. 22 is a perspective view of an embodiment of a mobile device security device.

FIG. 22 is a perspective view of another embodiment of a security device 46 including four sliding arms configured to hold a mobile device, such as a tablet. This embodiment of the security device 46 is similar to the embodiment illustrated in FIGS. 12-17C in that the security device 46 includes four sliding arms 48, 52, 54, 56. In this embodiment, at least one arm 56 is oversized to accommodate folding mobile devices, such as a mobile device with a detachable keyboard. This oversized arm 56 includes an elbow portion 58 to allow display of the mobile device in an angled configuration, for example, with a screen angled relative to an attached keyboard.

Figure 23:
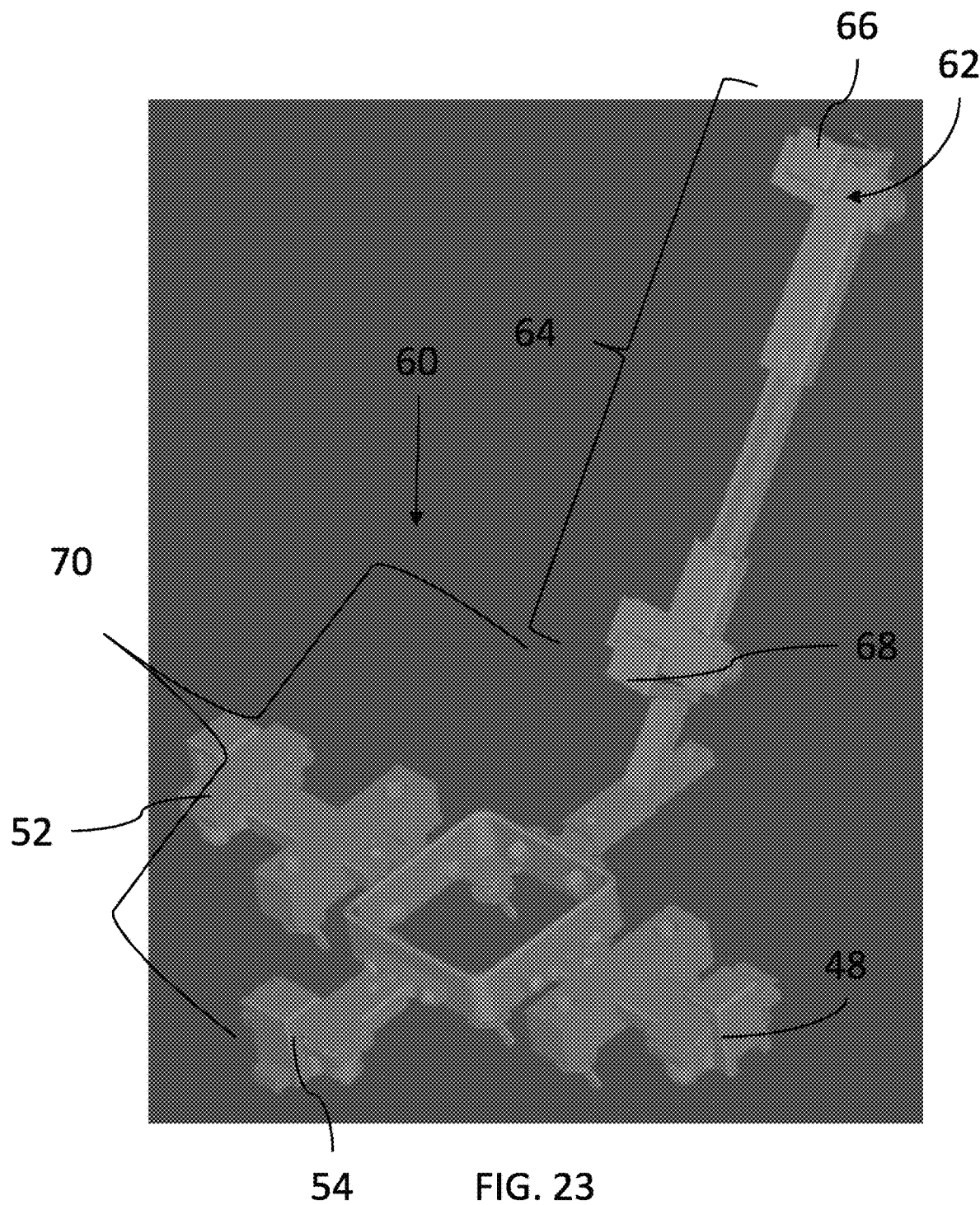
FIG. 23 is a perspective view of an embodiment of a mobile device security device.

FIG. 23 is a perspective view of yet another embodiment of a security device 60. Similar to the security device 46 described above, the security device 60 can have four sliding arms 48, 52, 54, 62, including one oversized sliding arm 62. In this embodiment, the oversized sliding arm 62 has a first mounting portion 64 formed by first and second sub-arms or secondary retention members 66, 68, at least one of which is a sliding arm. In addition, the oversized sliding arm 62 cooperates with the remaining sliding arms 48, 52, 54 to form a second mounting portion 70. The security device 60 can be used to display a two-piece mobile device. For example, a mobile device with a detachable keyboard can be displayed in the security device 60, with the mobile device held in the first mounting portion 64 and the detachable keyboard held in the second mounting portion 70. In this way, a two-piece mobile device can be securely displayed while clearly identifying the mobile device as a two-piece device.

Figure 24:
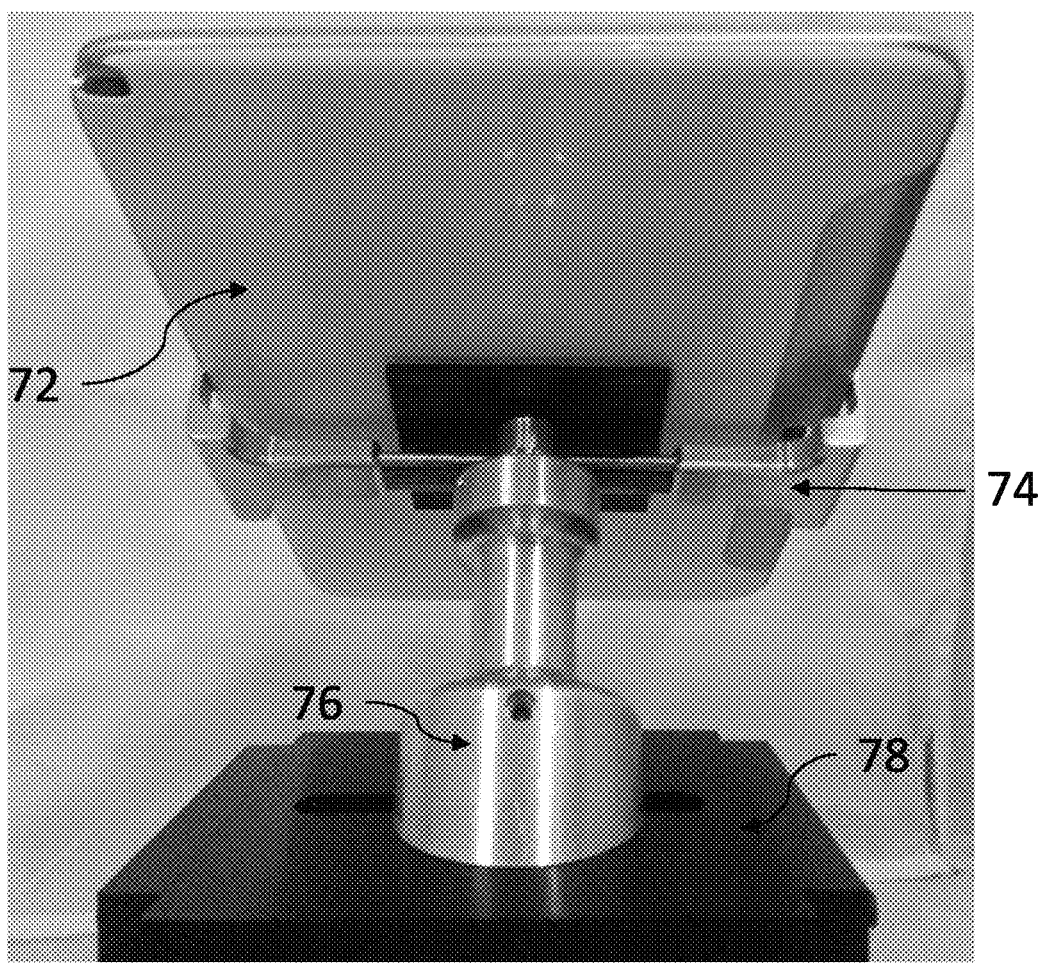
FIG. 24 is an illustration of a mobile device mounted on an embodiment of a mobile device security device.

FIG. 24 illustrates an embodiment of a mobile device 72 mounted to a security device 74 coupled to a base 76 and a mounting surface 78.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements it will be understood that the exemplary embodiments can be practiced utilizing either less than or more than the certain number of elements.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A security device for a portable electronic device, the security device comprising:
   a body extending along a body plane;
   a first sliding member configured to be supported by a first portion of the body, the first sliding member having a distal end comprising a first retention member extending substantially horizontally from the distal end of the first sliding member above the body plane of an upper body surface, wherein one of the first sliding member and the first portion of the body comprises a first guide track, the first guide track comprising a first slot traversing the one of the first sliding member and the body, wherein the first guide track is closed at each end, and wherein the first sliding member is coupled to the first portion of the body through the first slot and configured to move along the first guide track parallel to the body plane; and
   a second sliding member configured to be supported by a second portion of the body, the second sliding member having a distal end comprising a second retention member extending substantially horizontally from the distal end of the first sliding member above the body plane of the upper body surface, wherein one of the second sliding member and the second portion of the body comprises a second guide track, the second guide track comprising a second slot traversing the one of the second sliding member and the body, wherein the second guide track is closed at each end, and wherein the second sliding member is coupled to the second portion of the body through the second slot and configured to move along the second guide track parallel to the body plane, wherein the first portion of the body and the second portion of the body are spatially separated.

2. The security device of claim 1, further comprising a leveling plate coupled to a component of the security device and configured to receive the portable electronic device, wherein the leveling plate is configured to move along a Z-axis relative to the upper body surface.

3. The security device of claim 1, wherein the first sliding member is a first sliding arm and the second sliding member is a second sliding arm.

4. The security device of claim 1, further comprising:
a first fastener configured to extend through the slot of the first guide track to couple the first sliding member to the first portion of the body; and
a second fastener configured to extend through the slot of the second guide track to couple the second sliding member to the second portion of the body.

5. The security device of claim 1, wherein each of the first retention member of the first sliding member and the second retention member of the second sliding member is configured to clamp on the portable electronic device to retain the portable electronic device in the security device.

6. The security device of claim 1, further comprising a third sliding member, wherein a distal end of the third sliding member has a third retention member extending substantially horizontally from the distal end of the third sliding member above the body plane.

7. The security device of claim 1, wherein the first sliding member and the second sliding member extend along the same axis.

8. A security device for a portable electronic device, the security device comprising:
a body extending along a body plane;
a first sliding member configured to be supported by a first portion of the body, the first sliding member having a distal end comprising a first retention member, wherein one of the first sliding member and the first portion of the body comprises a first guide track, the first guide track comprising a first slot traversing the one of the first sliding member and the first portion of the body, wherein the first guide track is closed at each end, and wherein the first sliding member is coupled to the first portion of the body through the first slot and configured to move along the guide track parallel to the body plane; and
a second sliding member configured to be supported by a second portion of the body, the second sliding member having a distal end comprising a second retention member, wherein one of the second sliding member and the second portion of the body comprises a second guide track, the second guide track comprising a second slot traversing the one of the second sliding member and the second portion of the body, wherein the second guide track is closed at each end, wherein the second sliding member is coupled to the second portion of the body through the second slot and move along the second guide track parallel to the body plane, and wherein the first portion of the body and the second portion of the body are spatially separated.

9. The security device of claim 8, wherein:
the first retention member extends substantially horizontally from the distal end of the first sliding member above the body plane; and
the second retention member extends substantially horizontally from the distal end of the second sliding member above the body plane.

10. The security device of claim 9, further comprising a leveling plate coupled to a component of the security device and configured to receive the portable electronic device, wherein the leveling plate is configured to move along a Z-axis relative to an upper surface of the body.

11. The security device of claim 8, wherein the first sliding member is a first sliding arm and the second sliding member is a second sliding arm.

12. The security device of claim 8, further comprising:
a first fastener configured to extend through the slot of the first guide track to couple the first sliding member to the first portion of the body; and
a second fastener configured to extend through the slot of the second guide track to couple the second sliding member to the second portion of the body.

13. The security device of claim 8, wherein each of the first retention member of the first sliding member and the second retention member of the second sliding member is configured to clamp on the portable electronic device to retain the portable electronic device in the security device.

14. The security device of claim 8, further comprising a third sliding member, wherein a distal end of the third sliding member has a third retention member extending substantially horizontally from the distal end of the third sliding member above the body plane of an upper body surface.

15. The security device of claim 8, wherein the first sliding member and the second sliding member extend along a same axis.

* * * * *